(12) United States Patent
Spear

(10) Patent No.: US 7,005,608 B2
(45) Date of Patent: Feb. 28, 2006

(54) COOLING SYSTEM FOR ARC WELDING

(75) Inventor: Theresa Chih-Lei Miao Spear, Highland Hts., OH (US)

(73) Assignee: Lincoln Global, Inc., Monterey Park, CA (US)

( * ) Notice: Subject to any disclaimer, the term of this patent is extended or adjusted under 35 U.S.C. 154(b) by 160 days.

(21) Appl. No.: 10/635,161

(22) Filed: Aug. 7, 2003

(65) Prior Publication Data

US 2005/0029241 A1   Feb. 10, 2005

(51) Int. Cl.
*B23K 9/10* (2006.01)

(52) U.S. Cl. .................................. 219/130.1

(58) Field of Classification Search ............. 219/130.1; 361/676, 678
See application file for complete search history.

(56) References Cited

U.S. PATENT DOCUMENTS

| | | | | |
|---|---|---|---|---|
| 3,592,260 A | * | 7/1971 | Berger | ......................... 165/121 |
| 5,624,589 A | * | 4/1997 | Latvis et al. | ................. 219/133 |
| 5,642,260 A | * | 6/1997 | Sigl | ............................ 361/695 |
| 6,081,423 A | * | 6/2000 | Griffin | ........................ 361/688 |
| 6,489,591 B1 | | 12/2002 | Achtner | |
| 6,650,540 B1 | * | 11/2003 | Ishikawa | ..................... 361/695 |
| 6,803,541 B1 | * | 10/2004 | Andersen et al. | ........ 219/130.1 |
| 6,888,099 B1 | * | 5/2005 | Schneider | ................ 219/130.1 |

OTHER PUBLICATIONS

Brochure by *EBM Industries—Better Commercial and Industrial Ducted Air Movement* pp. 138 and 139.

* cited by examiner

*Primary Examiner*—Kevin P. Kerns
(74) *Attorney, Agent, or Firm*—Fay, Sharpe, Fagan, Minnich & McKee, LLP

(57) ABSTRACT

An electric arc welder with an internal compartment containing heat generating electrical components where the compartment has an end wall defining the outlet wall of a plenum chamber and the end wall has large, unimpeded outlet openings. The plenum chamber having an inlet wall with an air opening and including an air moving device with an axial inlet ring and a radial discharge impeller mounted on the inlet wall over the air opening to pressurize air in the plenum chamber to force air from the outlet opening at a velocity exceeding about 2000 ft/min.

33 Claims, 5 Drawing Sheets a = 18.7 in
e = 5.75 in
f = 13.0 in a = 18.7 in
b = 2.15 in
c = 2.15 in
d = 6.8 in

COOLING SYSTEM FOR ARC WELDING

The present invention relates to the art of electric arc welders and more particularly to a unique cooling system for the cabinet of an arc welder and an arc welder employing such cooling system.

INCORPORATION BY REFERENCE

Electric arc welders are often housed in a cabinet so that the heat generating electrical components associated with the welder and housed in the cabinet require forced air to dissipate generated heat. Achtner U.S. Pat. No. 6,489,591 and Sigl U.S. Pat. No. 5,642,260 are representative of electric arc welder cabinets having internal air directing cooling systems. These patents are incorporated by reference herein to show the details of an arc welder cabinet and heat generating components. Such cabinets are the type to which the present invention is applicable. These patents are incorporated by reference herein as background information so that the details of the cabinet and internal electrical components are not necessary to understand the present invention. The invention involves use of a well known air moving device utilizing an axial discharge impeller. Such a device is sold by ebm Industries and is illustrated in pages 138 and 139 of a brochure from that company. These two pages are incorporated by reference herein so the details of the air moving device used in the present invention need not be repeated.

BACKGROUND OF INVENTION

Electric arc welders are normally housed in a metal cabinet containing various electrical components necessary for creating high current used in an electric arc welding process. Since the current in an electric arc welder is quite high, the interior of the cabinet gets quite hot and are not efficiently cooled even though the components are mounted on high efficiency heat sinks. To dissipate the heat from the heat sink in the cabinet, it is common practice to provide one or more high speed fans that circulate air based upon a pressure drop from the inlet of the fan to the outlet of the fan. It has been found that such fans move air relatively slowly; however, if the output pressure becomes quite high the efficiency of the cooling operation is decreased. Thus, there is a need in the electric arc welding field to efficiently cool the interior of the cabinet of a welder and particularly the several heat sinks onto which are mounted heat generating components for the welder.

THE INVENTION

The present invention relates to a cooling system for the cabinet of an electric arc welder, which system comprises a plenum chamber with an air outlet wall, an air inlet and an air moving device communicated with the air inlet to pressurize the plenum chamber. By then providing an outlet wall having spaced apart outlet openings for directing air into the cabinets, the air moving device can pressurize the chamber. In this manner, a high velocity air flow issues from the outlet openings, where the velocity of air from the outlet openings exceeds about 2000 feet per minute (ft/min). Indeed, the size of the plenum chamber, the capability of the air moving device and the total area of the outlet openings are coordinated to produce an outlet velocity in the neighborhood of 3000 feet per minute. Then, standard metal or plastic ducts connected to the outlet openings direct high velocity air over the fins of standard heat sinks onto which electrical components are mounted. These heat sinks are arranged in series and have their fins extending into the ducts so the ducts form cooling tunnels.

In another aspect of the present invention, there is provided an electric arc welder with an internal compartment or cabinet containing heat generating electrical components. The compartment has an end wall defining the outlet wall of a plenum chamber and has large, unimpeded openings with a combined first area. The openings are large and unimpeded, such as large rectangular openings. The plenum chamber has an inlet wall with an air opening having second area so that the inlet wall and outlet wall define a given volume for the plenum chamber. An air moving device is provided with an axial inlet ring and a radial discharge impeller mounted over the air opening to pressurize air in the plenum chamber. The air in the plenum chamber is forced by pressure from the outlet opening or openings at a velocity exceeding about 2000 feet per minute and preferably about 3000 feet per minute. This electric arc welder preferably includes an air moving device located in the plenum chamber itself, with the inlet ring mounted over the air opening of the inlet wall of the chamber. The electrical components are mounted on heat sinks and an air duct from one or more of the outlet openings is constructed over the heat sinks to impinge air upon the heat sink at high velocity, in the neighborhood of 3000 feet per minute. This efficiently cools the heat sink and maintains the electrical components at the necessary low temperature. The area of the inlet opening and the area of the outlet openings is created, such that high velocity air flows from the outlet openings of the plenum chamber. In accordance with an aspect of the invention, the combined area of the outlet openings is greater than the air inlet opening by about 5%–20%. By this relationship, high velocity air flows from the openings into the cabinet and preferably through air directing ducts containing the fins of the heat sinks.

In the preferred embodiment of the invention, the inlet opening has an area of about 26 square inches and the outlet openings have a combined area of about 29.2 inches. In this manner, a standard impeller air moving device, forcing the air transversely in the plenum chamber and not axially through the openings, causes a high velocity based upon the pressurized level of air in the plenum chamber.

The primary object of the present invention is the provision of a cooling system for the cabinet of an electric arc welder, which cooling system incorporates a plenum chamber so pressurized air is directed through large openings in a wall as contrasted with the axial flow of a rotary fan.

Still a further object of the present invention is the provision of a cooling system, as defined above, which cooling system utilizes pressurized air in a plenum chamber as opposed to axial flow from a rotary fan.

Yet another object of the present invention is the provision of a cooling system, as defined above, which cooling system generates air flowing at a velocity exceeding 2000 feet per minute and preferably at least about 3000 feet per minute.

Still another object of the present invention is the provision of an electric arc welder having a cooling system as defined above.

These and other objects and advantages will become apparent from the following description taken together with the accompanying drawings.

PREFERRED EMBODIMENT

Figure 1:
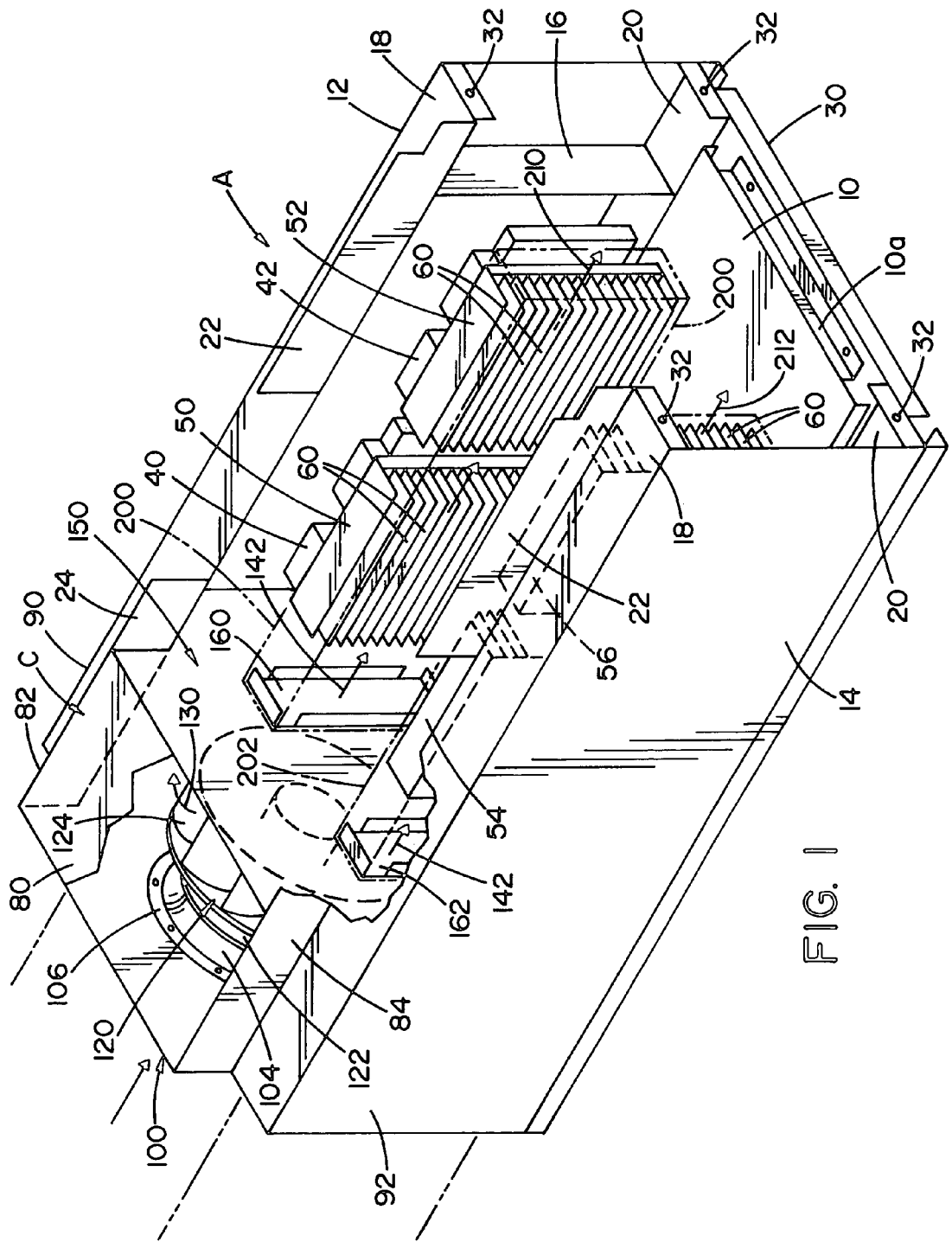
FIG. 1 is a pictorial view of an electric arc welder cabinet having cut-away portions to illustrate electrical components mounted on a series of heat sinks with duct work, shown in phantom lines.
Figure 2:
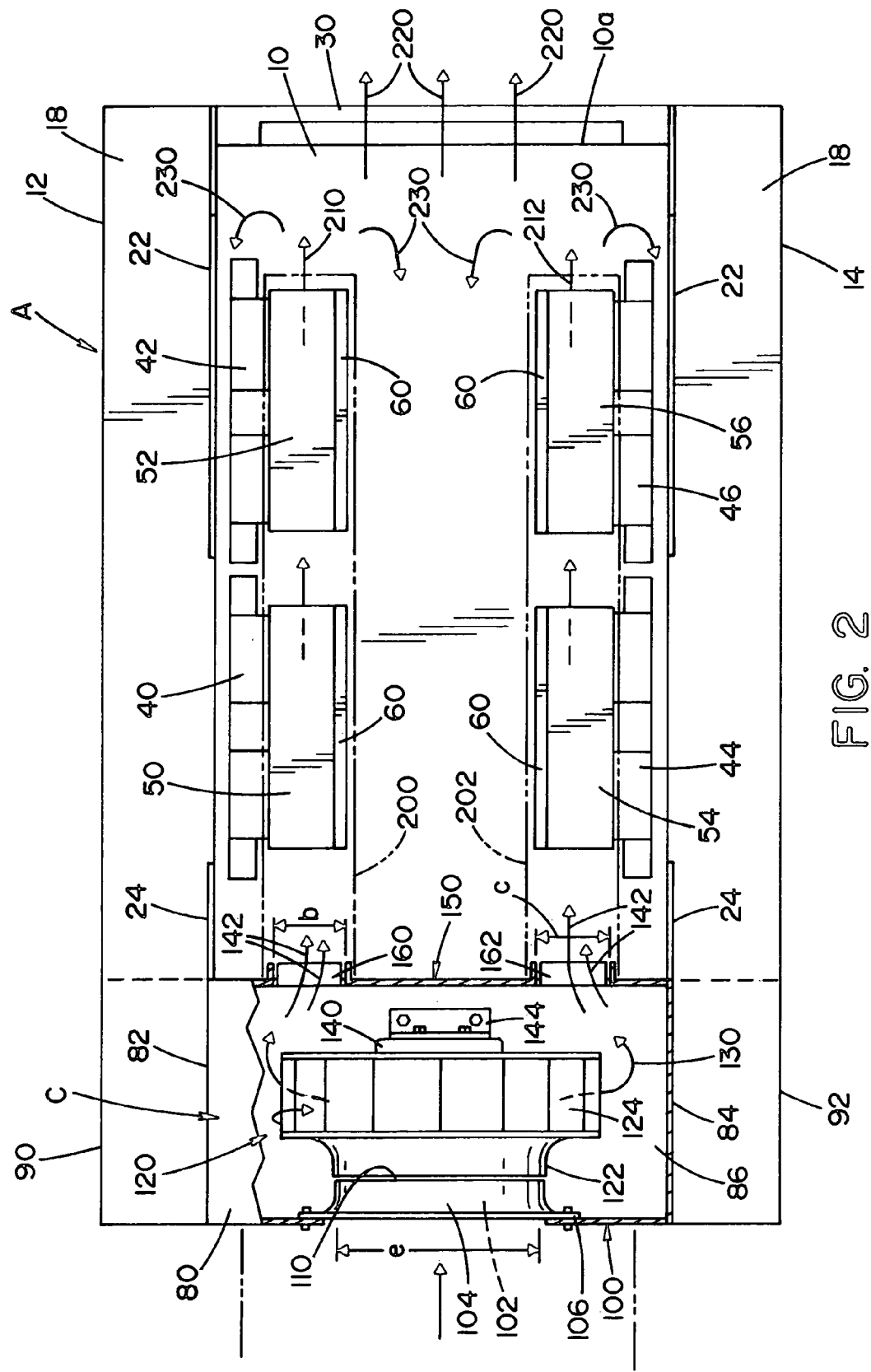
FIG. 2 is a top plan view showing a plenum chamber of the present invention in partial cross-section to illustrate the flow of the impeller air moving device to pressurize the plenum chamber of the welder.
Figure 3:
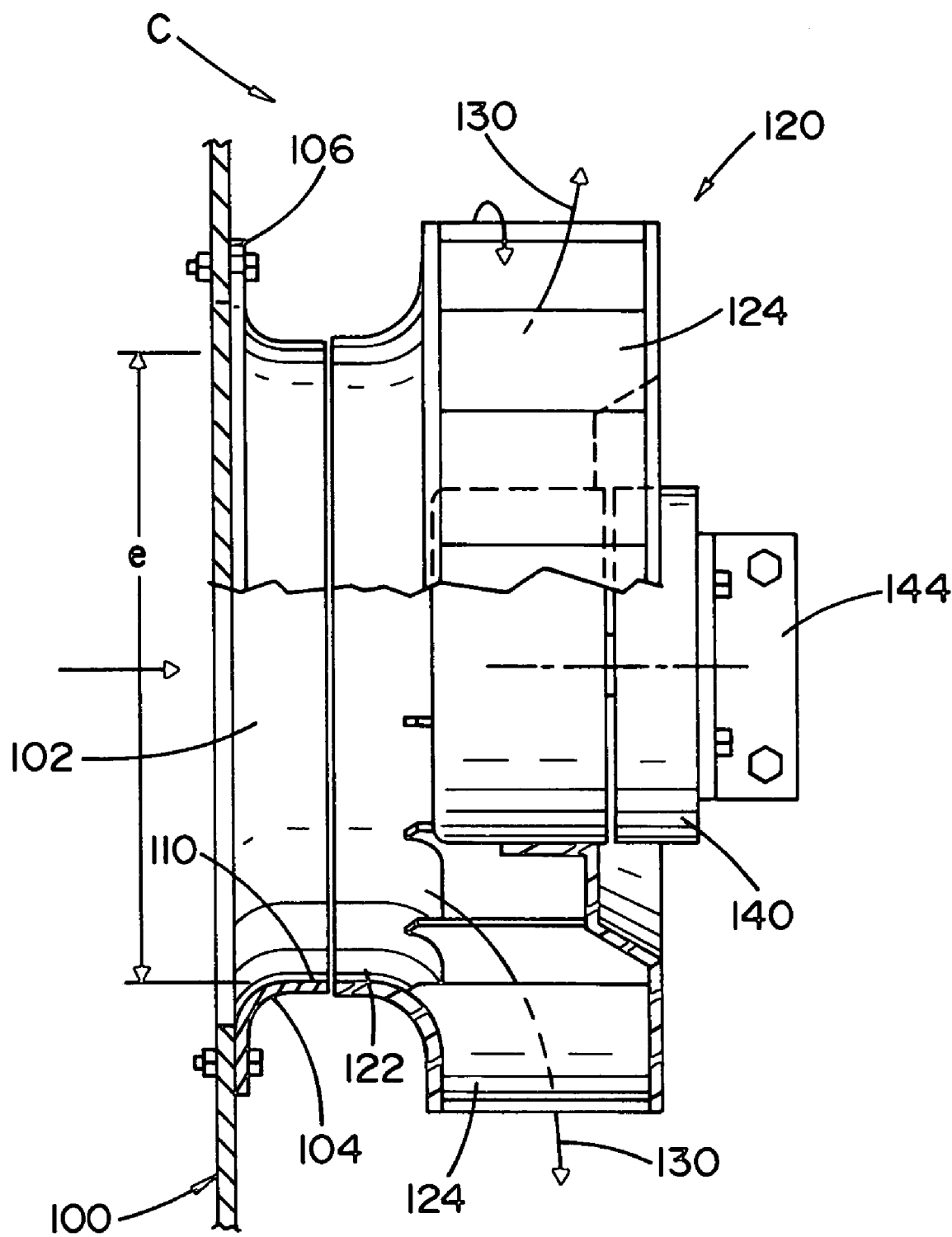
FIG. 3 is a large partially cross-sectioned view of the impeller used in the preferred embodiment of the present invention.

Referring now to FIGS. 1–3, a standard cabinet A for housing an electric arc welder includes a sheet metal bottom support platform 10 with upstanding flanges 10a mounted on a lower base 30. Platform 10 supports the various components within the cabinet having sides 12, 14. Each of these sides includes one or more reinforcing plates 16 and parallel, horizontal flanges 18, 20 that define the outside portion of the cabinet. Upstanding cover supporting mounts 22, 24 are provided on flanges 18 to receive an upper cover not illustrated. For illustrative purposes, FIG. 1 omits the end cap normally having louvered openings and supported on cabinet A by holes 32. Within the compartment of cabinet A are heat generating electrical components represented as packages 40, 42, 44 and 46 mounted upon finned heat sinks 50, 52, 54 and 56, respectively. Each of these heat sinks includes a series of integral, parallel fins 60 through which air is circulated to cool the heat sinks and thus dissipate heat from components 40, 42, 44 and 46, as well as other electrical components in cabinet A. As so far described, cabinet A does not differ substantially from a normal electric arc welder cabinet wherein low velocity air is circulated by a rotary fan over or through fins 60.

Figure 6:
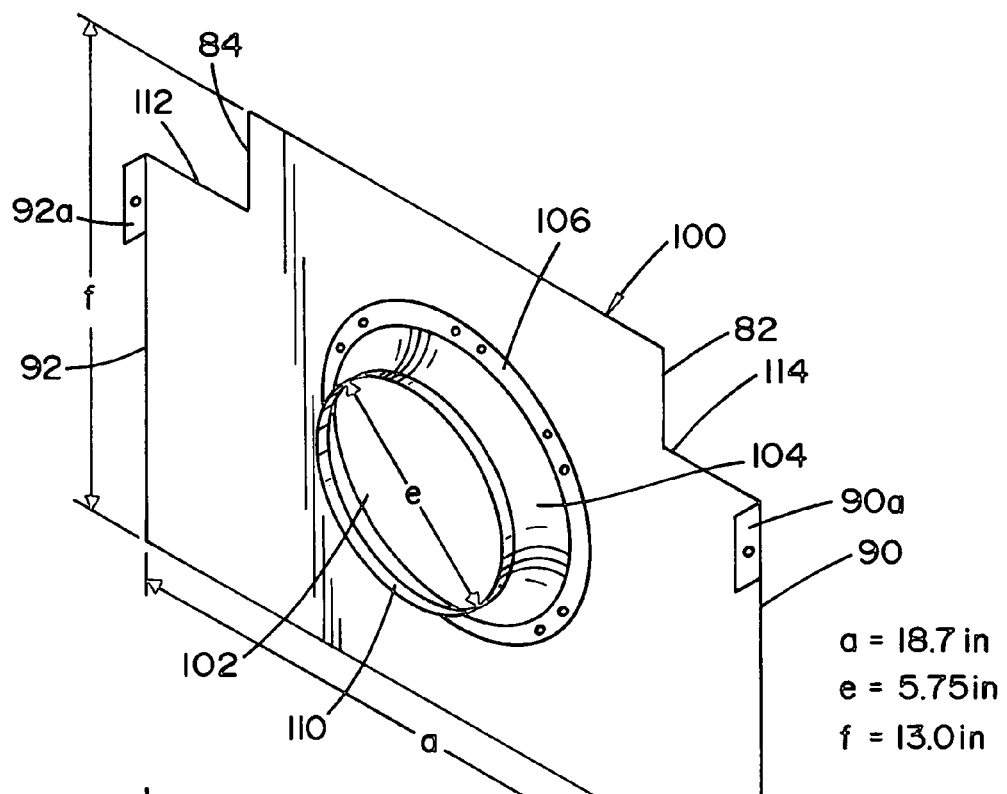
FIG. 6 is a pictorial view of the inlet wall of the plenum chamber illustrating the dimensions of the air openings; and, FIG. 7 is a pictorial view similar to FIG. 6 showing the outlet wall of the plenum chamber used in the preferred embodiment of the present invention and containing dimensions used in the preferred embodiment.
Figure 7:
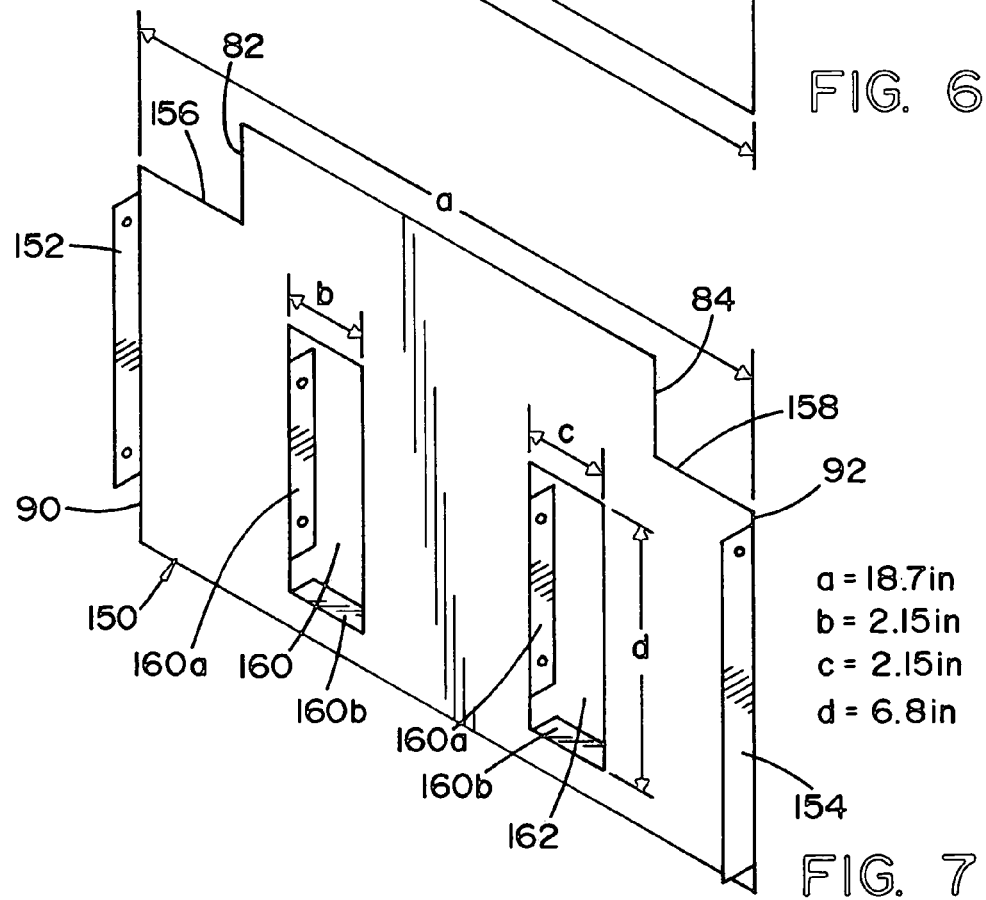

In accordance with the present invention, cabinet A is cooled by a plenum chamber C at one end of the cabinet and including a top 80, small vertical sides 82,84, a bottom 86 and outboard walls 90,92. This plenum chamber has an inlet wall 100, best shown in FIG. 6, with an air opening 102 having an effective area represented by diameter e which in the illustrated embodiment is 5.75 inches. A flared inlet ring 104 is bolted by rim 106 over opening 102 of wall 100. This flared ring defines an inlet opening 110 with a diameter. As shown in FIG. 6, inlet wall 100 has notched portions 112,114, which in the preferred embodiment are approximately 10 square inches. Ring 104 is communicated on axially with the inlet of air moving device 120 of the impeller type sold by ebm Industries. The air moving device has an inlet mouth 122 aligned with opening 110 and an impeller 124 for discharging air outwardly as indicated by arrows 130 when the impeller is rotated by motor 140 supported on L-shaped mounting plate 144. As the impeller rotates air is forced radially outwardly around the 360° defining the outer periphery of impeller 124. In this manner, impeller 124 draws air through opening 110 having an area of approximately 26 square inches. This air is forced radially outwardly into chamber C. This pressurizes the air in the chamber to cause air to flow as indicated by arrows 142 into the compartment of cabinet A. To cause the air indicated by arrows 142 to have a velocity of about 3000 feet per minute, plenum chamber C has an outlet wall 150, best shown in FIG. 7. This wall has flanges 152,154 for mounting the wall as shown in FIGS. 1 and 2. Outlet notches 156,158 match notches 112,114, respectively, to define the plenum chamber having essentially a rectangular shape with a width a and a height f. To create the high velocity pressure, large uninhibited outlet openings 160,162 are provided in wall 150. These outlets have a rectangular shape with dimensions as illustrated in FIG. 7, where opening 160 has a width b and a height d and opening 162 has a width c and a height d. With these dimensions, pressurized air in plenum chamber C forces air outwardly at a high velocity through openings 160 and 162. This velocity is greater than about 2000 feet per second and preferably about 3000 feet per second. The selection of the size and speed of air moving device 120 together with the volume of chamber C and the dimensions of openings 160,162 creates high velocity airflow. In the preferred embodiment, ducts 200,202 direct the air from outlets 160,162 through fins 60. This is indicated by the arrows 210,212. The fins are actually in ducts 200,202. Air from the fins accumulates at the far end of cabinet A so that it exits through the louvers in the missing end cap, as indicated by arrows 220 or moves inwardly as indicated by arrows 230. Single ducts or ducts extending only in the spacing between openings 160,162 and the heat sinks is an alternative arrangement for the air ducts. The dimensions set forth in FIGS. 6 and 7 are representative and are selected to provide the high velocity flow from a pressurized plenum chamber in accordance with the present invention. Flanges 160a,160b are to mount the ducts. Flanges 90a,92a are used to mount wall 100.

Figure 4:
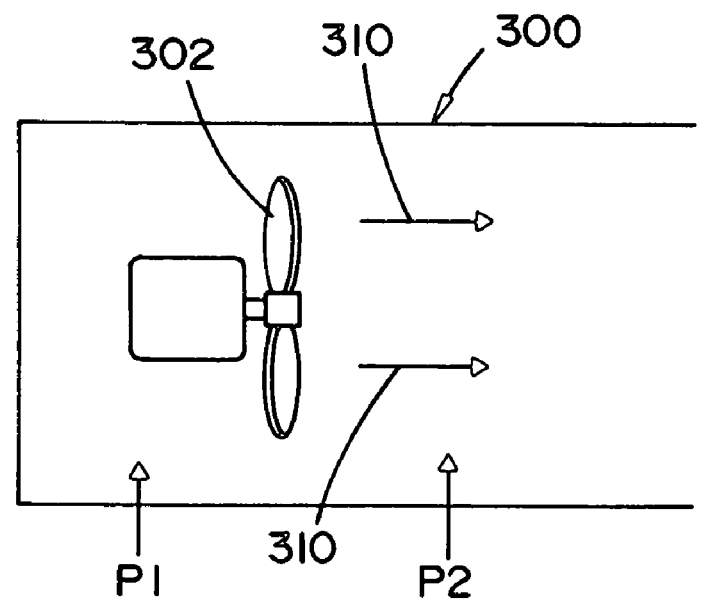
FIG. 4 is a schematic view of a prior art cooling system utilizing an axial flow fan.
Figure 5:
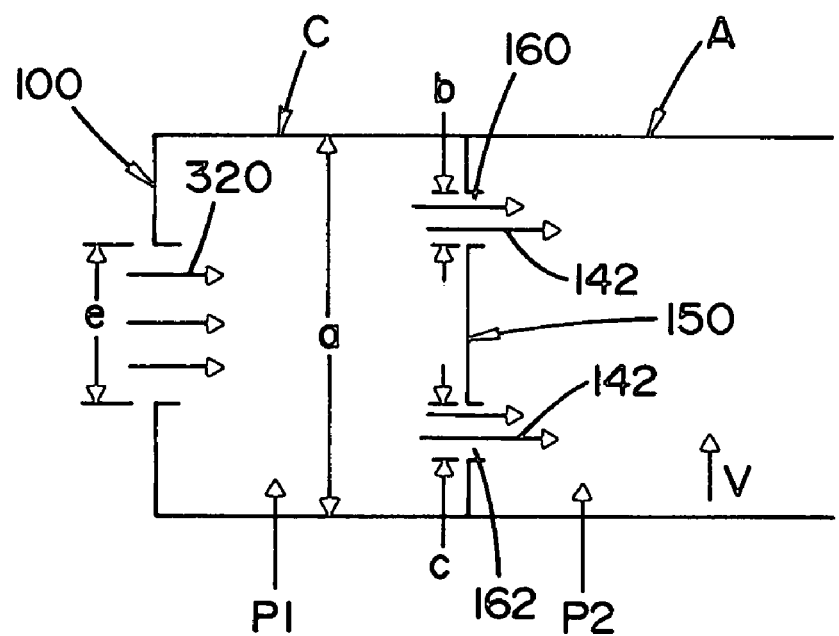
FIG. 5 is a top view showing schematically the dimensions of the plenum chamber used in practicing the present invention.

The distinction of the present invention over the prior art is schematically represented by a comparison of FIGS. 4 and 5. In FIG. 4, a standard cabinet 300 includes fan 302 directing air in an axial direction, as indicated by arrows 310. As the pressure P2 increases, the efficiency and velocity of the air decreases. The fan tends to increase this pressure; therefore the prior art rotary fan cooling system is highly inefficient. In FIG. 5, chamber C is pressurized so that the pressure P1 is greater than the pressure P2. This is the reverse of a fan. This causes high velocity air flow 142 through openings 160,162 in outlet wall 150. Air, indicated by arrows 320, is drawn from the atmosphere by the air moving impeller to merely pressurize chamber C. This is completely different than the prior art shown in FIG. 4 and creates high velocity air flow (depicted schematically at V in FIG. 5) based upon a pressure differential between the plenum chamber and the remainder of cabinet A.

Various devices are used for pressurizing chamber C. The air moving device is either mounted in the chamber, as shown in the preferred embodiment, or externally. The plenum chamber can be an added chamber onto the end of cabinet A or integrally formed by the sheet metal of the cabinet as illustrated in the preferred embodiment. The various dimensions, as set forth in FIGS. 6 and 7, are not intended to be limiting, but only representative of an arrangement for accomplishing the objective of high velocity air flow over the heat sink fins. In accordance with the invention, the area of the large, unimpeded openings 160, 162 is substantially greater than the inlet area of opening 110. In practice, the difference is about a 10% enlargement. In accordance with an aspect of the invention, the difference in area is between 5% and 20%. In this manner, high velocity is obtained. "Unimpeded" outlet openings 160, 162 means that they are large volumes for air flow uninhibited from chamber C into the internal compartment of cabinet A. Any impediments, such as created by small holes or louvers substantially reduce the efficiency of the invention utilizing a pressurized plenum chamber with large outlet openings.

Having thus defined the invention, the following is claimed:

1. An electric arc welder with an internal compartment containing heat generating electrical components, said compartment having an end wall defining an outlet wall of a plenum chamber and having large, unimpeded outlet openings with a combined first area, said chamber having an inlet wall with an air opening having a second area; said inlet wall and outlet wall being generally parallel to define a given volume for said plenum chamber; and, an air moving device with an axial inlet ring and a radial discharge impeller mounted on said inlet wall over said air opening to pressurize air in said plenum chamber to force air from said outlet opening at a velocity exceeding about 2000 ft/min.

2. An electric arc welder as defined in claim 1 wherein said air moving device is mounted in said plenum chamber with said inlet ring over said air opening.

3. An electric arc welder as defined in claim 2 wherein at least one of said electrical components is mounted on a heat sink and including an air duct extending from one of said outlet openings toward said heat sink.

4. An electric arc welder as defined in claim 1 wherein at least one of said electrical components is mounted on a heat sink and including an air duct extending from one of said outlet openings toward said heat sink.

5. An electric arc welder as defined in claim 4 wherein said outlet wall has two spaced outlet openings.

6. An electric arc welder as defined in claim 2 wherein said outlet wall has two spaced outlet openings.

7. An electric arc welder as defined in claim 1 wherein said outlet wall has two spaced outlet openings.

8. An electric arc welder as defined in claim 7 wherein said openings are generally rectangular.

9. An electric arc welder as defined in claim 6 wherein said openings are generally rectangular.

10. An electric arc welder as defined in claim 4 wherein said outlet opening is generally rectangular.

11. An electric arc welder as defined in claim 3 wherein said outlet opening is generally rectangular.

12. An electric arc welder as defined in claim 11 wherein said first area is greater than said second area.

13. An electric arc welder as defined in claim 12 wherein said first area is greater than said second area by an amount in the range of 5%–20%.

14. An electric arc welder as defined in claim 10 wherein said first area is greater than said second area.

15. An electric arc welder as defined in claim 14 wherein said first area is greater than said second area by an amount in the range of 5%–20%.

16. An electric arc welder as defined in claim 8 wherein said first area is greater than said second area.

17. An electric arc welder as defined in claim 16 wherein said first area is greater than said second area by an amount in the range of 5%–20%.

18. An electric arc welder as defined in claim 7 wherein said first area is greater than said second area.

19. An electric arc welder as defined in claim 18 wherein said first area is greater than said second area by an amount in the range of 5%–20%.

20. An electric arc welder as defined in claim 4 wherein said first area is greater than said second area.

21. An electric arc welder as defined in claim 20 wherein said first area is greater than said second area by an amount in the range of 5%–20%.

22. An electric arc welder as defined in claim 2 wherein said first area is greater than said second area.

23. An electric arc welder as defined in claim 22 wherein said first area is greater than said second area by an amount in the range of 5%–20%.

24. An electric arc welder as defined in claim 1 wherein said first area is greater than said second area.

25. An electric arc welder as defined in claim 24 wherein said first area is greater than said second area by an amount in the range of 5%–20%.

26. An electric arc welder as defined in claim 25 wherein said velocity is about 3000 ft/min.

27. An electric arc welder as defined in claim 24 wherein said velocity is about 3000 ft/min.

28. An electric arc welder as defined in claim 2 wherein said velocity is about 3000 ft/min.

29. An electric arc welder as defined in claim 1 wherein said velocity is about 3000 ft/min.

30. An electric arc welder with an internal compartment containing heat generating electrical components, said compartment having an end wall defining the outlet wall of a plenum chamber and having large, unimpeded outlet openings; said chamber having an inlet wall with an air opening; and, an air moving device with an axial inlet ring and a radial discharge impeller mounted on said inlet wall over said air opening to pressurize air in said plenum chamber to force air from said outlet opening at a velocity exceeding about 2000 ft/min.

31. An electric arc welder as defined in claim 30 wherein said air moving device is mounted in said plenum chamber with said inlet ring over said air opening.

32. An electric arc welder as defined in claim 30 wherein said outlet wall has two spaced outlet openings.

33. An electric arc welder as defined in claim 32 wherein said openings are generally rectangular.

* * * * *